US007970681B1

(12) United States Patent
Bridges et al.

(10) Patent No.: US 7,970,681 B1
(45) Date of Patent: Jun. 28, 2011

(54) REDUCTION OF FINANCIAL INSTRUMENT VOLATILITY

(75) Inventors: Tim Bridges, Summit, NJ (US); Mark Evans, New York, NY (US); Oliver Frankel, New York, NY (US)

(73) Assignee: Goldman Sachs & Co., New York, NY (US)

( * ) Notice: Subject to any disclaimer, the term of this patent is extended or adjusted under 35 U.S.C. 154(b) by 2069 days.

(21) Appl. No.: 09/723,694

(22) Filed: Nov. 28, 2000

Related U.S. Application Data

(60) Provisional application No. 60/195,909, filed on Apr. 10, 2000.

(51) Int. Cl.
*G06Q 40/00* (2006.01)
(52) U.S. Cl. ..................................... 705/36 R
(58) Field of Classification Search ............ 705/31, 705/35–45
See application file for complete search history.

(56) References Cited

U.S. PATENT DOCUMENTS

| | | | | |
|---|---|---|---|---|
| 5,136,501 A | | 8/1992 | Silverman et al. ............ 364/408 |
| 5,148,365 A | * | 9/1992 | Dembo ............................ 705/36 |
| 5,696,907 A | * | 12/1997 | Tom ................................. 705/38 |
| 5,704,045 A | | 12/1997 | King et al. | |
| 5,724,424 A | | 3/1998 | Gifford | |
| 5,761,442 A | * | 6/1998 | Barr et al. ........................ 705/36 |
| 5,784,696 A | * | 7/1998 | Melnikoff ........................ 705/36 |
| 5,787,402 A | | 7/1998 | Potter et al. ..................... 705/37 |
| 5,802,500 A | * | 9/1998 | Ryan et al. ...................... 705/36 |
| 5,812,987 A | | 9/1998 | Luskin et al. ................... 705/36 |
| 5,812,988 A | * | 9/1998 | Sandretto ........................ 705/36 |
| 5,819,237 A | * | 10/1998 | Garman .......................... 705/36 |
| 5,832,462 A | | 11/1998 | Midorikawa et al. ........... 705/35 |
| 5,884,287 A | * | 3/1999 | Edesess .......................... 705/36 |
| 5,905,974 A | | 5/1999 | Fraser et al. | |
| 5,924,082 A | | 7/1999 | Silverman et al. .............. 705/37 |
| 5,924,083 A | | 7/1999 | Silverman et al. .............. 705/37 |

(Continued)

FOREIGN PATENT DOCUMENTS

WO 9621903 A1 7/1996

(Continued)

OTHER PUBLICATIONS

European Patent Office "Communication pursuant to Article 94(3) EPC", Dec. 14, 2007 for European Patent Application No. 01 966 783.1—2221, 5pgs.

(Continued)

*Primary Examiner* — Richard C Weisberger
(74) *Attorney, Agent, or Firm* — Chadbourne & Parke LLP; John A. Squires

(57) ABSTRACT

An earnings volatility reduction procedure includes determining a first sensitivity value of a portfolio to underlying market conditions, trading in an immunizing instrument having a second sensitivity value substantially equal in magnitude and opposite in value of the first sensitivity value, and trading in a qualifying instrument having a third sensitivity value substantially equal to the first sensitivity value. A derivative portfolio (in particular, one that includes a financial instrument for which changes in value are characterized as earnings pursuant to FAS 133) is structured by determining a sensitivity of the derivative portfolio with respect to financial conditions in a trading market, executing an immunizing purchase of a second trading instrument in an amount equal to the magnitude of the current sensitivity and opposite in value, and executing a qualifying sale of a third trading instrument in an amount equal to amount of the current sensitivity.

18 Claims, 1 Drawing Sheet

U.S. PATENT DOCUMENTS

| | | | | |
|---|---|---|---|---|
| 5,950,476 | A * | 9/1999 | Brashear | 72/205 |
| 5,963,923 | A | 10/1999 | Garber | 705/37 |
| 5,978,485 | A | 11/1999 | Rosen | 380/49 |
| 5,991,743 | A * | 11/1999 | Irving et al. | 705/36 |
| 6,006,202 | A * | 12/1999 | Ramaswamy et al. | 705/28 |
| 6,018,722 | A * | 1/2000 | Ray et al. | 705/36 |
| 6,021,397 | A | 2/2000 | Jones et al. | |
| 6,049,783 | A * | 4/2000 | Segal et al. | 705/37 |
| 6,061,662 | A * | 5/2000 | Makivic | 705/36 |
| 6,061,663 | A | 5/2000 | Bloom et al. | 705/36 |
| 6,064,985 | A * | 5/2000 | Anderson | 705/36 |
| 6,078,904 | A * | 6/2000 | Rebane | 705/36 |
| 6,101,484 | A | 8/2000 | Halbert et al. | |
| 6,144,959 | A | 11/2000 | Anderson et al. | |
| 6,157,918 | A | 12/2000 | Shepherd | |
| 6,161,098 | A * | 12/2000 | Wallman | 705/36 |
| 6,321,212 | B1 | 11/2001 | Lange | |
| 6,343,272 | B1 | 1/2002 | Payne et al. | |
| 6,393,409 | B2 | 5/2002 | Young et al. | |
| 6,513,019 | B2 | 1/2003 | Lewis | |
| 6,560,580 | B1 | 5/2003 | Fraser et al. | |
| 2001/0042785 | A1 | 11/2001 | Walker et al. | |
| 2004/0117302 | A1 | 6/2004 | Weichert et al. | |

FOREIGN PATENT DOCUMENTS

| | | |
|---|---|---|
| WO | 9838776 A1 | 9/1998 |
| WO | 9928843 A2 | 6/1999 |
| WO | 9954838 A1 | 10/1999 |
| WO | WO0048111 | 8/2000 |
| WO | WO0067139 | 11/2000 |

OTHER PUBLICATIONS

Financial Accounting Standards Board, "Summary of Statement No. 133"—Accounting for Derivative Instruments and Hedging Activities, (Issued Jun. 1998). [Retrieved Jul. 27, 2005] Retrieved from Internet: URL: <http://www.fasb.org/st/summary/stsum133.shtml> 2pgs.

Statement of Financial Accounting Standards No. 133, "Accounting for Derivative Instruments and Hedging Activities", Jun. 1998, Financial Accounting Standards Board. 213 pages.

Kawaller, "A Novel Approach to Transaction Based Currency Exposure Management,"Financial Analysts Journal, 1992.

Edmund L. Jenkins et al., "Statement of financial accounting standards No. 133, accounting for derivative instruments and hedging activities," Journal of Accountancy, New York, Nov 1998, vol. 186, iss. 5; 24pgs.

Business Wire, Enermark Announces Second Quarter Results Business Editors. Business Wire, New York, Aug 18, 2000.

"DevX Energy, Inc. Reports Record Earnings in 1st Quarter," Business Editors, Business Wire, New York, Nov. 14, 2000. 6pgs.

"PCT International Search Report," mailed Jul. 9, 2001 for PCT/US01/11355.

"International Preliminary Examination Report," dated Jul. 14, 2002 for PCT/US01/11355.

"PCT International Search Report," mailed Dec. 4, 2002 for PCT/US01/44485.

"International Preliminary Examination Report," dated Apr. 24, 2003 for PCT/US01/44485.

Supplementary European Search Report, dated Feb. 2007 for EP 01 99 8881, 2 pgs.

\* cited by examiner

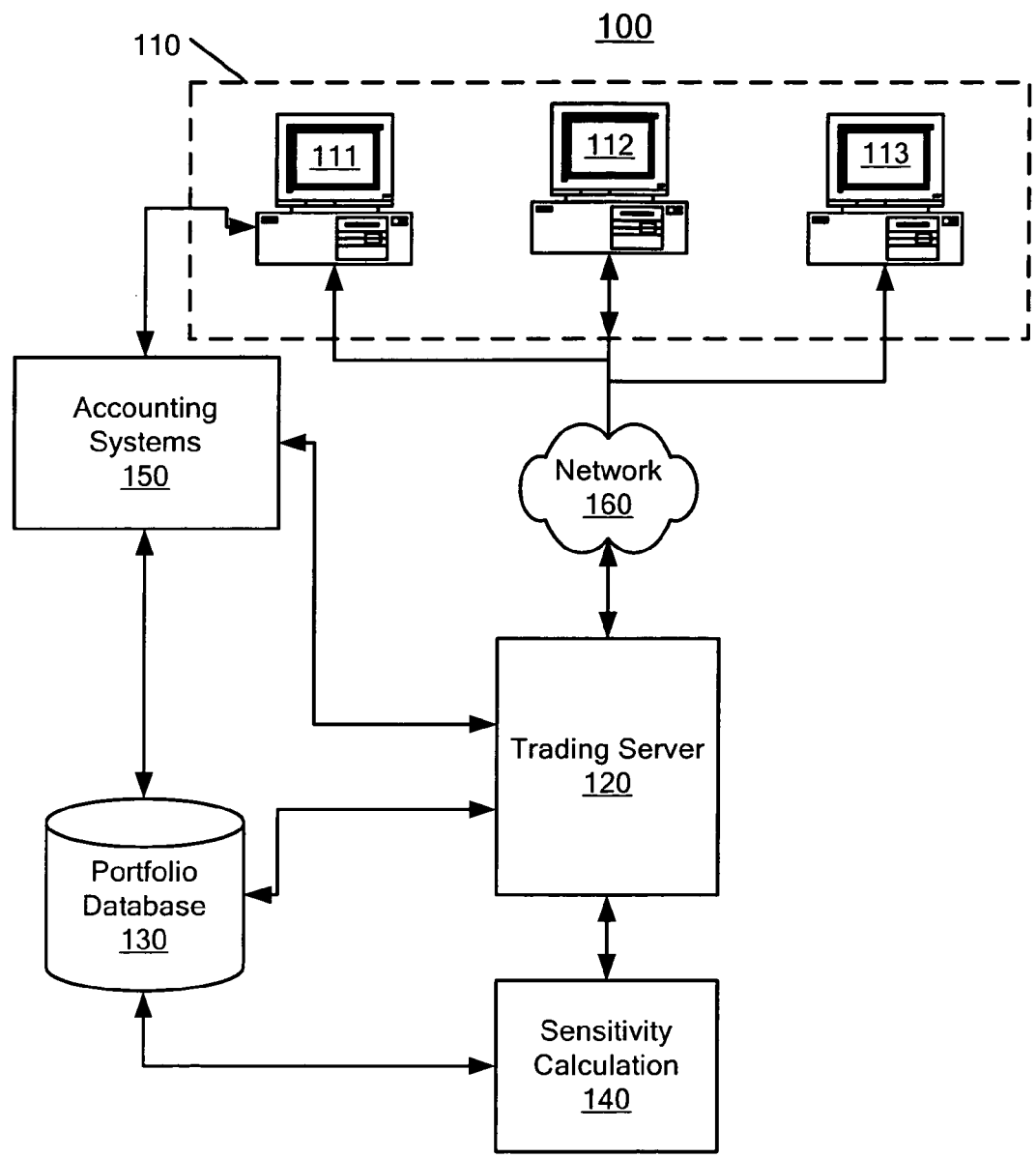

REDUCTION OF FINANCIAL INSTRUMENT VOLATILITY

This application claims the benefit of the filing date of U.S. provisional application Ser. No. 60/195,909 entitled "Reduction of Financial Instrument Volatility" which was filed on Apr. 10, 2000, and is related to a U.S. patent application entitled "Dynamic Reallocation Hedge Accounting" filed on the same day and naming the same inventors.

BACKGROUND OF THE INVENTION

Financial Accounting Standards Board Statement No. 133 (FAS 133) ("Accounting for Derivative Instruments and Hedging Activities"), as amended by Financial Accounting Standards Board Statement No. 138 (FAS 138), establishes accounting and reporting standards for derivative instruments and for hedging activities. Briefly, FAS 133 requires that an entity recognize all derivatives as either assets or liabilities in the statement of financial position and measure those instruments at fair value. If certain conditions are met, a derivative may be specifically designated as (a) a hedge of the exposure to changes in the fair value of a recognized asset or liability or an unrecognized firm commitment, (b) a hedge of the exposure to variable cash flows of a recognized asset, liability or of a forecasted transaction, or (c) a hedge of the foreign currency exposure of a net investment in a foreign operation, an unrecognized firm commitment, an available-for-sale security, or a foreign-currency-denominated forecasted transaction.

The accounting for changes in the fair value of a derivative (that is, gains and losses) depends on the intended use of the derivative and the resulting designation.

For a derivative designated as hedging the exposure to changes in the fair value of a recognized asset or liability or a firm commitment (referred to as a fair value hedge), the gain or loss is recognized in earnings in the period of change together with the offsetting loss or gain on the hedged item attributable to the risk being hedged. The effect of that accounting is to reflect in earnings the extent to which the hedge is not effective in achieving offsetting changes in fair value.

For a derivative designated as hedging the exposure to variable cash flows of a forecasted transaction (referred to as a cash flow hedge), the effective portion of the derivative's gain or loss is initially reported as a component of other comprehensive income (OCI) (outside earnings) and subsequently reclassified into earnings when the forecasted transaction affects earnings. The ineffective portion of the gain or loss together with any excluded portion is reported in earnings immediately.

For a derivative designated as hedging the foreign currency exposure of a net investment in a foreign operation, the effective portion of the gain or loss is reported in other comprehensive income (outside earnings) as part of the cumulative translation adjustment. The accounting for a fair value hedge described above applies to a derivative designated as a hedge of the foreign currency exposure of an unrecognized firm commitment or an available-for-sale security. Similarly, the accounting for a cash flow hedge described above applies to a derivative designated as a hedge of the foreign currency exposure of a foreign-currency-denominated forecasted transaction.

For a derivative not designated as a hedging instrument, the gain or loss is recognized in earnings in the period of change.

One of the requirements for hedge accounting when using a derivative is that changes in the value of the derivative must be expected to be highly effective in offsetting changes in value (or projected cash flows) of the hedged item. When hedging with options, one issue that may arise under FAS 133 is whether changes in time value can be included in the assessment of hedge effectiveness. In a totally static hedge strategy in which the hedged items do not contain embedded options, changes in time value would generally not offset changes in fair value or projected cash flows. To allow purchased options to qualify for hedge accounting, FAS 133 permits exclusion of all or a part of the hedging instrument's time value from the assessment of hedge effectiveness. If time value is excluded from the assessment of the hedge effectiveness, then the change in the time value would have to be recognized in earnings as they occur. FAS 133 suggest two methods that can be used with respect to excluding time value changes: (i) time value being computed as the fair value of the option minus the intrinsic value; and (ii) time value being computed as the fair value of the option minus the minimum value.

FAS 133 requires derivatives to be highly effective if they are to qualify for hedge accounting. The decision of how hedge effectiveness will be measured affects the determination of whether an item is (likely to be) highly effective and potentially the amount deferred in other comprehensive income (OCI). To be eligible for hedge accounting, FAS 133 requires "Both at inception of the hedge and on an ongoing basis, the hedging relationship is expected to be highly effective in achieving offsetting changes in fair value (cash flow) attributable to the hedged risk during the period that the hedge is designated." (par. 20b/28b). The Statement notes (par. 389) "The Board intends "highly effective" to be essentially the same as the notion of "high correlation" in Statement 80."

In hedging with purchased options, ineffectiveness can arise due to the dynamic nature of market prices. For example, large moves in spot prices can introduce hedge ineffectiveness. This results from the fact that the option price is a convex function of the spot rate, whereas the value of the hedged item is linear in spot. In addition, because the option price is a function of volatility, whereas the value of the underlying is not, changes in market volatility can lead to hedge ineffectiveness. It is noted that the change in value of an option due to changes in volatility can be excluded from the test of effectiveness; however, if this were done, changes due to volatility would have to be reported in earnings. Furthermore, the value of an option may change with time, while the value of the hedged item does not. It is noted that the change in the value of the option due to changes in time may be excluded from the test of effectiveness; however, if this is done, changes due to time decay would have to be reported in earnings.

Methods for determining whether a hedge is highly effective include (i) the cumulative offset method or (ii) by the rolling historical correlation method. Cumulative offset methodology measures effectiveness by dividing the cumulative change in value of the derivative with the cumulative change in either fair value or projected cash flows of the item being hedged. A hedge may be viewed as effective when the cumulative offset ratio calculated by comparing these two numbers is within a range of approximately 80% to 125%. Rolling historical correlation methodology can be used before hedge inception to determine whether the application of hedge accounting is reasonable given past results. This method may also be used to measure ongoing effectiveness once a hedge is put in place. For example, the company decides to measure effectiveness based on a rolling two year correlation. 3 months into a hedge, it will measure correlation based upon the trailing 2 years which will include the 3 months' hedge results plus the 21 months' prior to putting the hedge in place. An r-squared of approximately 0.8 (correlation coefficient of 0.894) is generally considered sufficient for a company to apply hedge accounting.

With respect to options, one hedging method in which changes in time value (or at least those unrelated to changes in volatility) are considered "effective" is a so-called delta-neutral hedge. FAS 133 specifically permits a type of delta-neutral hedging in which a company hedges a fixed cash position by adjusting the notional amount of the option it owns (FAS 133, paragraphs 85-87). More specifically, FAS 133 permits a company to monitor an option's 'delta'—the ratio of changes in the option's price to changes in the price of the underlying. As the delta ratio changes, the company buys or sells put options so that the next change in the fair value of all the options held can be expected to counterbalance the next change in the value of (the underlying)." In general, for Call options hedging a strengthening underlying, the delta ratio moves closer to one (i.e., 100%) as the underlying strengthens and moves closer to zero as the underlying weakens. The delta ratio also changes as the time to expiry decreases, as interest rates change, and as implied volatility changes.

In some cases, delta neutral hedging of a fixed cash position achieved through adjustments to the notional amount of an option, as disclosed by FAS 133, is undesirable because it changes the economics of the strategy from, for example, a simple option purchase. Consequently, other "effective" hedging strategies compatible with a wide range of desired economic outcomes are desirable.

TERMINOLOGY

Black-Scholes: A solution for valuing options developed by Fischer Black, Myron Scholes and Robert Merton in 1973 for which they shared the Nobel Prize in Economics.
Call Option: A call option is a financial contract giving the owner the right, but not the obligation to buy a pre-set amount of the underlying financial instrument at a pre-set price with a pre-set maturity date.
Collar: A combination of options in which the holder of the contract has bought one out-of-the money option call (or put) and sold one (or more) out-of-the-money puts (or calls). Doing this locks in the minimum and maximum rates that the collar owner will use to transact in the underlying at expiry.
Delta: The sensitivity of the change in the financial instrument's price to small changes in the price of the underlying market prices, rates or index. Delta specifies the change in the value of a derivative as a fraction of the change in forward value of the underlying (provided the change is small). Thus, if the delta of a Euro (EUR) put is −35%, a forward appreciation of the EUR by 0.01 will reduce the value of the put by (−35%)*(0.01)=0.0035 (holding other factors constant). Other variants are also commonly used, such as the sensitivity of the value or future value of the derivative to changes in the spot price of the underlying.

Delta for a European option can be computed from the well-known Black-Scholes formula. For a put option, the formula to compute Delta is $$\text{Delta} = -N(-d_1)e^{-rT},$$

while for a call option, the formula to compute Delta is $$\text{Delta} = N(d_1)e^{-rT},$$

where: N( ) is the standard cumulative normal distribution; r is the domestic risk-free continuously compounded interest rate; T is the time to option expiration (in years); ln is the natural (base e) logarithm; F is the forward price of the underlying (to the settlement date of the option); K is the strike price of the option; is the implied volatility of the underlying exchange rate; and $$d_1 = \frac{\ln\left(\frac{F}{K}\right) + (\sigma^2)\frac{T}{2}}{\sigma\sqrt{T}}.$$

Alternatively, Delta may be calculated numerically for any pricing method employed to value a derivative.
Forward Contract: An over-the-counter obligation to buy or sell a financial instrument or to make a payment at some point in the future, the details of which were settled privately between the two counterparties.
Gamma: (or convexity) is the degree of curvature in the financial contract's price curve with respect to its underlying price. It is the rate of change of the delta with respect to changes in the underlying price.
Knockout Call: An option the existence of which is conditional upon a pre-set trigger price trading before the option's designated maturity. The option is deemed to exist unless the trigger price is touched before maturity.
Mark-to-Market (MTM): The current market value of a financial instrument.
Option: The right (but not the obligation) to buy (or, conversely, sell) some underlying instrument at a pre-determined rate on a pre-determined expiration date in a pre-set amount.
Over-the-Counter: Any transaction that takes place between two counterparties and does not involve an exchange is said to be an over-the-counter transaction.
Put Option: A put option is a financial contract giving the owner the right, but not the obligation to sell a pre-set amount of the underlying at a pre-set price with a pre-set maturity date.

SUMMARY OF THE INVENTION

In general, in one aspect, the invention features a method of reducing earnings volatility in accounting for a derivative portfolio pursuant to Financial Standards Accounting Board Statement Number 133. The method includes determining a first sensitivity value of a portfolio to underlying market conditions, trading in an immunizing instrument having a second sensitivity value substantially equal in magnitude and opposite in value of the first sensitivity value, and trading in a qualifying instrument having a third sensitivity value substantially equal to the first sensitivity value.

In general, in another aspect, the invention features a method of structuring a derivative portfolio (in particular, a derivative portfolio that includes a financial instrument for which change in value are characterized as earnings pursuant to FAS 133 accounting). The method includes determining a sensitivity of the derivative portfolio with respect to financial conditions in a trading market, executing an immunizing purchase of a second trading instrument in an amount equal to the magnitude of the current sensitivity and opposite in value, and executing a qualifying sale of a third trading instrument in an amount equal to amount of the current sensitivity.

Methods of the invention may be implemented in a computer apparatus that includes a processor, database, and stored instructions to configure the processor to process data in accordance with the methods of the invention.

Implementations may include one or more of the following features. The underlying market conditions may include price and rate conditions. The sensitivity values may be notational amount values or composite values based on a multiple financial instruments. The portfolio may be a derivative portfolio that includes a financial instrument characterized in that changes in value are accounted for as quarterly earnings pursuant to FAS 133. Sensitivity can be expressed as a schedule of forward notional amounts. Trading in the immunizing instrument may include transacting an at-the-market purchase establishing a long position in a first trading instrument. Trading in the qualifying instrument may include transacting an at-the-market fixed price sale establishing a short position in a second trading instrument. The first trading instrument may include different constituent financial instruments. The portfolio, the first trading instrument, and the second trading instrument may be related to a common commodity.

Implementations may include one or more of the following features. The amount equal to the current sensitivity may include a quarterly forward amount. Determining a sensitivity may include determining a delta measurement.

The details of one or more embodiments of the invention are set forth in the accompanying drawings and the description below. Other features, objects, and advantages of the invention will be apparent from the description and drawings, and from the claims.

DESCRIPTION OF THE DRAWINGS

The FIGURE shows a computer network diagram.

DETAILED DESCRIPTION OF THE INVENTION

To qualify as a fair value or cash flow hedge, FAS 133 requires (among the criteria set forth in Paragraphs 20 and 28) that hedging instruments a) must be effective (i.e. the basis risk to the underlying must be stable), and b) the hedging instrument must not be a "written option". In general, hedging instruments that are either a simple forward sales, purchased options, or combination of simple forward sales and purchased options are not considered "written options." However, for other types of hedging structures, a determination of whether the structure is a "written option" may be uncertain. This may create difficulties in consistently interpreting and implementing FAS 133. This confusion, may cause a reduction in the use of hedging instruments and, consequently, may limit financial advantages that can be obtained through their use.

Under FAS 133, some hedges that are meaningful (i.e., provide protection against volatility) in a long-term context (relative to a single quarter of earnings), but which do not qualify as either a cash flow hedge or a fair value hedge, must have their quarter-to-quarter change in mark-to-market value (MTM value) accounted for through a company's quarterly earnings. Other hedges that do qualify as either cash flow or fair value hedges must have certain components (such as time value) excluded from the assessment of hedge effectiveness and these components must be marked to market through earnings. Both of these circumstances may lead to an undesirable side effect of FAS 133 in which a hedge effected to reduce cash-flow or fair value volatility results in increased quarterly earnings volatility. In contrast, marked-to-market hedges that qualify under FAS 133 are entered in a company's balance sheet under Other Comprehensive Income (OCI) and do not have the same effects on quarterly earnings volatility.

Implementations of the invention, can include a portfolio structuring procedure that can reduce or remove the undesirable quarterly earnings volatility side effect of FAS 133. As a result of the procedure disclosed herein, the exposure to market prices of hedging instruments or components of hedging instruments whose change in mark (i.e., current market price) must, under FAS 133, be accounted for by adjustment to earnings is reduced. This reduction may be obtained while still appropriately revealing large changes in mark that may occur in a "LIBOR squared" hedge. A description of this volatility reduction procedure follows. To aid understanding, the procedure is described with respect to a financial portfolio of a fictional company ("CompanyX").

CompanyX is a company dealing in purchase, and sale of a commodity (e.g., Copper). CompanyX has transacted five Index Amortizing transactions in this commodity as part of its long-term strategic risk management program. CompanyX's portfolio is composed of five years of Index Amortizing Forward Sales, potentially hedging 50% of the next five years production. The portfolio of Index Amortizing transactions has not qualified as a cash-flow hedge. In seeking to conform to FAS 133, CompanyX has been accounting for the mark-to-market (MTM) volatility of the Index Amortizing transactions through quarterly earnings. An undesirable result of accounting for the change in MTM value of this long term hedge portfolio in each quarter is an increase in short-term earnings volatility. This result may occur even though, in the long term, CompanyX's hedge portfolio may have a net effect of reducing volatility. CompanyX seeks to reduce this quarterly MTM volatility of the portion of CompanyX's hedge portfolio that does not qualify for hedge (i.e., OCI) accounting, thereby reducing the volatility of quarterly earnings accounted for under FAS 133.

The change in the value of the Index Amortizing transactions is equal, to first order, to the change in the underlying commodity (i.e., copper) price multiplied by the delta of the portfolio (wherein delta is the sensitivity of the change in the portfolio's price to changes in the price of the underlying index for the commodity). Eliminating the effects of the delta on the portion of the portfolio that does not qualify for OCI hedge accounting will significantly reduce the mark-to-market volatility that would be taken through quarterly earnings.

Implementations of the invention may reduce or neutralize the sensitivity of the non-OCI portion of the portfolio (i.e., the portion for which changes in the mark-to-market is accounted for through earnings). This can be achieved with little or no economic impact by, in effect, transferring the delta (the sensitivity of the portfolio to changes in the underlying price) from a set of instruments that does not receive hedge accounting (and, consequently, is accounted for through quarterly earnings) to a second set of instruments that does receive hedge accounting and can be accounted for through OCI. This may significantly reduce the volatility of CompanyX's quarterly earnings resulting from changes in the mark-to-market value of the portfolio of Index Amortizing Forward Sales.

This reduction in the quarter-to-quarter earnings volatility due to non cash flow hedge accounting under FAS 133 may be implemented by structuring a new portfolio to include components that offset each other and counter volatility. In the example that follows, two equal and offsetting components are used:

1st Component:

A first component to the new hedging portfolio is established on "day one" (where "day one" is a beginning time period and is not necessarily limited to a single day). On day one, bucketized sensitivity reports to underlying market prices and rates are run on the non-qualifying derivative instruments to determine the current sensitivity of the contingent portion of Company X's Index Amortizing portfolio. The bucketized sensitivity reports can be determined for an instrument by taking a whole curve of forward prices into account. By changing each of these forward prices, just a little, one-by-one, and examining the resulting change in the instrument's price, the sensitivity to changes in forward prices can be determined. Computation of bucketized sensitivity reports may be computer implemented. CompanyX then transacts an at-the-market long swap (purchase) in quarterly forward amounts equal to the current sensitivity of the contingent portion of CompanyX's Index Amortizing portfolio (i.e., fixed-for-floating swaps). This transaction serves to immunize the mark-to-market value of this portion of the Index Amortizing portfolio from changes in the copper forward prices, and temporarily "freeze" the mark of the portfolio that flows through earnings.

This purchase is not elected for and does not qualify for hedge accounting: thus, the quarterly change in mark-to-market of this swap purchase flows through earnings. We shall refer to this first component as the immunizing instrument.

2nd Component:

CompanyX also transacts an equivalent short position by selling an amount of a commodity equal to the amount purchased in the immunizing instrument. The short position is in the form of a standard at-market fixed price swap which qualifies for hedge accounting and, correspondingly, can be accounted for through Other Comprehensive Income (OCI). In general, this short position transaction is performed close in time (i.e., within days) of the long swap (1st component) transaction. Note, however, that no fixed time period is required—the required closeness in time will depend upon underlying volatility of the market.

To improve the likelihood that the sale would qualify for hedge accounting, it may be advantageous to transact the 1st component purchases as an option collar with a tight ($50/MT) spread between the purchased call and sold put. The use of collars rather than long swaps may avoid netting of swaps and reverse swaps that could have the effect of reducing effectiveness of the volatility reduction procedure.

As a result of the combination of the 1st and 2nd component transactions, the market sensitivity (delta) incurred from the immunizing instrument and that incurred from the short position offset each other. Since the first order bucketized sensitivities of the immunizing instrument (i.e., the 1st component instruments) and the fixed-for-floating swaps (i.e., the 2nd component instruments) are equal or very similar, the net effect of these transactions, at day one, is economically negligible.

The result is that the portfolio of instruments whose change in mark must go through earnings, the non-qualifying portfolio and the immunizing instrument, has, day one, no exposure to market prices and rates, and little exposure "day two" (unless the non-qualifying portfolio is "ill-behaved").

Maintenance:

Because the sensitivity (delta) of the Index Amortizing portfolio changes as the market price rises and falls (as modeled by the second order function gamma), the portfolio taken through earnings will no longer be delta neutral. To neutralize the delta, offsetting incremental immunizing instruments (i.e., 1st component purchases) and sales (i.e., 2nd component sales) will need to be transacted on a periodic basis (weekly or monthly, a.k.a. "day two") to return the new portfolio to a delta neutral position. In general, the size of these incremental transactions will be small relative to the size of the initial offsetting trades. The net effect is that only the realized gamma of the second order effects of the Index Amortizing portfolio is taken through earnings and all first order effects (delta) go through Other Comprehensive Income (OCI). Changes in the sensitivity of the portfolio that result from rising and falling market prices are periodically calculated (by a computer-assisted system or manually) and, in response thereto, incremental amounts of offsetting forward purchases and sales needed to immunize the "earnings" portfolio at current market prices are determined.

A result of the described procedure is that, for well-behaved (but formally non-qualifying instruments), the impact on earnings volatility is substantially reduced while still satisfying the spirit and requirements of FAS 133. If the initial non-qualifying instrument is not well-behaved, effectiveness of the described procedure is reduced and, consequently, substantial impact to earnings will be reflected in CompanyX's quarterly earnings. For example, if the notional of the combined swaps were ever to exceed (a fraction of) forecasted cash-flows or product, then the excess could not be allocated to OCI and would have to go through quarterly earnings.

While the disclosed procedure may be implemented to overcome negative earnings volatility effects incurred by a more simplistic adherence to FAS 133, each step of the procedure can be implemented consistent with FAS 133 guidelines. The purchased forward (immunizing instrument) that goes through earnings may need to be structured as an option collar symmetrically around the forward to avoid netting with the short swap that goes through OCI.

The FIGURE shows a computer network that may be used in computer-implemented realizations of the invention. In the network shown in the FIGURE, both direct data connections between elements (e.g., between 130 and 150) are show, as well as connections through a data network 160. In conventional fashion, direct connections may be replaced by networked connections and networked connections by direct connections. Consequently, the computer architecture shown in the FIGURE is not intended as a limitation of the invention. Furthermore, multiple elements in network 100 may be implemented in a single computer device. For example, a single computer system may include server 120 processing functions, software and disk storage to implement a database 130, and software to perform mathematical calculation of element 140. In some implementations, some or all of the functions performed by computer components shown in the FIGURE may be implemented in a non-computerized fashion (e.g., by skilled traders).

In a computer-implementation of the invention, an institutional client or an investment consultant may use a workstation or other computer terminal 111 to provision, access, and monitor portfolio data processed by an accounting data processing computer system 150. The data processing system 150 may include software to perform, e.g., corporate accounting functions and to implement accounting transactions pursuant to FAS 133 and other Financial Accounting Standards Board statements. The system 150 may include an interface to a database system 130 storing portfolio structure and account data for the institutional client. The portfolio database and accounting data processing system 150 can be interconnected to a trading server 120. Brokers may access the trading server 120 from client computers 112-113 to execute trades on behalf of clients (and thereby make use of the invention) or, in some implementations, clients may have direct access to the trading server 120 from their own terminals 111.

A software module 140 (which may be a component of the trading server 140 or of a separate analysis system) can access the portfolio database 130 to determine the sensitivity (delta) and other financial instrument modeling parameters of investment portfolios. These modeling parameters can include delta and gamma parameters and other financial instrument modeling parameters (also known as "Greek" parameters). The Greek parameters may be calculated by the module 140 using known calculation formulas and procedures.

The trading server 120 can access the accounting data processing system 150 to identify portfolios that, in whole or in part, are not qualified as cash flow hedge accounts (and, consequently, their changes in mark-to-market value is not accounted for as other comprehensive income (OCI)). In response, a message or other signal may be generated indicating that advantageous financial treatment can be obtained using offsetting transactions in sets of immunizing and qualifying financial instruments. In an automated implementation, the system may analyze the non-cash flow portfolio holdings and, based on a sensitivity value of that holding (as calculated by module 140) identify the immunizing and qualifying purchase transactions that establish the desired substantially neutral delta position. The module 140 identifies these immunizing and qualifying transactions in accordance with FAS 133 such that beneficial treatment for the combined portfolio is obtained pursuant to other-comprehensive-income accounting procedures in compliance with FAS 133.

In more detail, the system 100 is configured to reduce earnings volatility in accounting for hedge transactions pursuant to FAS 133 by determining a sensitivity value of a derivative portfolio subject to other-than-cash-flow accounting pursuant to FAS 133. The trading component 120 can operate to complete an at-the-market purchase establishing a first long position in a first trading instrument in a quarterly forward amount equal to the current sensitivity (as determined by module 140) of the portfolio such that changes in value of immunizing instruments are subject to treatment as quarterly earnings pursuant to FAS 133. Implicit in the term "equal to the current sensitivity" is an understanding that the total value of trading is related to both the sensitivity of the instruments and the size of the underlying hedge portfolio. The system 120 also transacts qualifying transactions (e.g., an at-the-market fixed price sale establishing a first short position in a second trading instrument) such that changes in value of the qualifying transactions is accounted for under as OCI pursuant to FAS 133. In general, some or all of these operations of system 100 may be replaced by human-performed operations.

The system 100 can also include software to establish a substantially neutral delta of the portfolio in response to rising and falling markets. That is, the software 140 can transact purchases and sales to establish additional long and short positions so as to maintain a substantially neutral delta of a total of the long positions and short positions.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. For example, the sensitivity calculation element 140 can calculate delta (sensitivity) and gamma (the rate of change of delta) using the well-known Black-Scholes methods, modifications of the Black-Scholes method, or other (non-Black-Scholes) calculations of sensitivity. Accordingly, other embodiments are within the scope of the following claims.

What is claimed is:

1. A computer system comprising:
a processor coupled to a memory comprising instructions to configure the processor to:
determine a first sensitivity value of a portfolio to underlying market conditions;
determine an immunizing instrument based on a stored database of accounting rules characterizing changes in value of the immunizing instrument as subject to accounting as earnings;
execute a trade in the immunizing instrument having a second sensitivity value substantially equal in magnitude and opposite in value of the first sensitivity value;
determine a qualifying instrument based on the stored database of accounting rules characterizing changes in value of the qualifying instrument as subject to accountings as other comprehensive income (OCI); and
execute a trade of the qualifying instrument having a third sensitivity value substantially equal to the first sensitivity value, thereby reducing earnings volatility in a derivative account, wherein a change in mark-to-market value of the derivative account is accounted for through quarterly earnings.

2. The system of claim 1 wherein the underlying market conditions comprise price and rate conditions.

3. The system of claim 1 wherein where the first, second and the third sensitivity values comprise notational amount values.

4. The system of claim 1 wherein where the first, second and the third sensitivity values each comprise composite values and each of said sensitivity values is based on different plurality of financial instruments.

5. The system of claim 1 wherein at least one of the sensitivity values is expressed as a schedule of forward notional amounts.

6. The system of claim 1 wherein the instructions to trade in the immunizing instrument comprise instructions to transact an at-the-market purchase establishing a long position in a first trading instrument.

7. The system of claim 6 wherein the instructions to trade in the qualifying instrument comprise instructions to transact an at-the-market fixed price sale establishing a short position in a second trading instrument.

8. The system of claim 7 wherein the first trading instrument comprises a plurality of different constituent financial instruments.

9. The system of claim 1 wherein the portfolio, the immunizing instrument, and the qualifying instrument are related to a same commodity.

10. A processor-implemented method for reducing earnings volatility in a derivative account, comprising:
   determining a first sensitivity value of a portfolio to underlying market conditions;
   determining by a processor an immunizing instrument based on a stored database of accounting rules characterizing changes in value of the immunizing instrument as subject to accounting as earnings;
   executing a trade in the immunizing instrument having a second sensitivity value substantially equal in magnitude and opposite in value of the first sensitivity value;
   determining by a processor a qualifying instrument based on the stored database of accounting rules accounting rules characterizing changes in value of the qualifying instrument as subject to accountings as other comprehensive income (OCI); and
   executing a trade of the qualifying instrument having a third sensitivity value substantially equal to the first sensitivity value, thereby reducing earnings volatility in a derivative account, wherein a change in mark-to-market value of the derivative account is accounted for through quarterly earnings.

11. The method of claim 10 wherein the underlying market conditions comprise price and rate conditions.

12. The method of claim 10 wherein where the first, second and the third sensitivity values comprise notational amount values.

13. The method of claim 10 wherein where the first, second and the third sensitivity values each comprise composite values and each of said sensitivity values is based on different plurality of financial instruments.

14. The method of claim 10 wherein at least one of the sensitivity values is expressed as a schedule of forward notional amounts.

15. The method of claim 10 wherein the instructions to trade in the immunizing instrument comprise instructions to transact an at-the-market purchase establishing a long position in a first trading instrument.

16. The method of claim 15 wherein the instructions to trade in the qualifying instrument comprise instructions to transact an at-the-market fixed price sale establishing a short position in a second trading instrument.

17. The method of claim 15 wherein the first trading instrument comprises a plurality of different constituent financial instruments.

18. The method of claim 10 wherein the portfolio, the immunizing instrument, and the qualifying instrument are related to a same commodity.

* * * * *